(12) United States Patent
Neal et al.

(10) Patent No.: US 11,610,492 B2
(45) Date of Patent: Mar. 21, 2023

(54) UNIFIED DATA MANAGEMENT SYSTEM FOR UNMANNED VEHICLES USING DISTRIBUTED ARCHITECTURE

(71) Applicant: Aero Systems West, Inc., San Martin, CA (US)

(72) Inventors: Charles Neal, San Martin, CA (US); Russell Shirey, San Martin, CA (US); Prabjot Dhillon, San Martin, CA (US)

( * ) Notice: Subject to any disclaimer, the term of this patent is extended or adjusted under 35 U.S.C. 154(b) by 343 days.

(21) Appl. No.: 16/875,996

(22) Filed: May 16, 2020

(65) Prior Publication Data
US 2020/0279492 A1    Sep. 3, 2020

(51) Int. Cl.
| | |
|---|---|
| *G08G 5/00* | (2006.01) |
| *B64C 39/02* | (2006.01) |
| *G07C 5/00* | (2006.01) |
| *G07C 5/08* | (2006.01) |
| *G05D 1/00* | (2006.01) |

(52) U.S. Cl.
CPC ......... *G08G 5/0013* (2013.01); *B64C 39/024* (2013.01); *G05D 1/0022* (2013.01); *G07C 5/006* (2013.01); *G07C 5/008* (2013.01); *G07C 5/0841* (2013.01); *G08G 5/0069* (2013.01); *B64C 2201/127* (2013.01); *B64C 2201/146* (2013.01)

(58) Field of Classification Search
CPC .. G08G 5/0013; G08G 5/0069; G08G 5/0026; G08G 5/00; B64C 39/024; B64C 2201/127; B64C 2201/146; B64C 39/02; G05D 1/0022; G05D 1/00; G07C 5/006; G07C 5/008; G07C 5/0841; G07C 5/00
See application file for complete search history.

(56) References Cited

U.S. PATENT DOCUMENTS

| | | | |
|---|---|---|---|
| 9,405,005 B1 * | 8/2016 | Arteaga | ................ G01S 13/933 |
| 10,185,316 B2 | 1/2019 | Kablaoui | ............. G05D 1/0022 |
| 10,302,759 B1 * | 5/2019 | Arteaga | ................ G08G 5/0082 |
| 2016/0246297 A1 | 8/2016 | Song | .................... G05D 1/0022 |

FOREIGN PATENT DOCUMENTS

CN         104932529         2/2015

* cited by examiner

*Primary Examiner* — Yonel Beaulieu
(74) *Attorney, Agent, or Firm* — Michael R. Schramm

(57) ABSTRACT

A unified data management system for operating a UAS via an open architecture distributed architecture and use thereof. The system provides for the functional operation of all aspects required for operating a UAS throughout its service life. The system comprises a plurality of modules or individual sub-programs, each of which cooperatively functions with the other modules of the system, such that the system functions as a cooperative whole in the operation of a UAS. The System provides for adaptability to new and yet even unforeseen needs. When such need arises, a module tailored to satisfy such need may be prepared and integrated into the system. Further, in the case where the system is open architecture, third party users may create new modules that may be optionally incorporated into the system. The system allows for simultaneous access and use via a plurality of users in a plurality of remote locations.

20 Claims, 1 Drawing Sheet

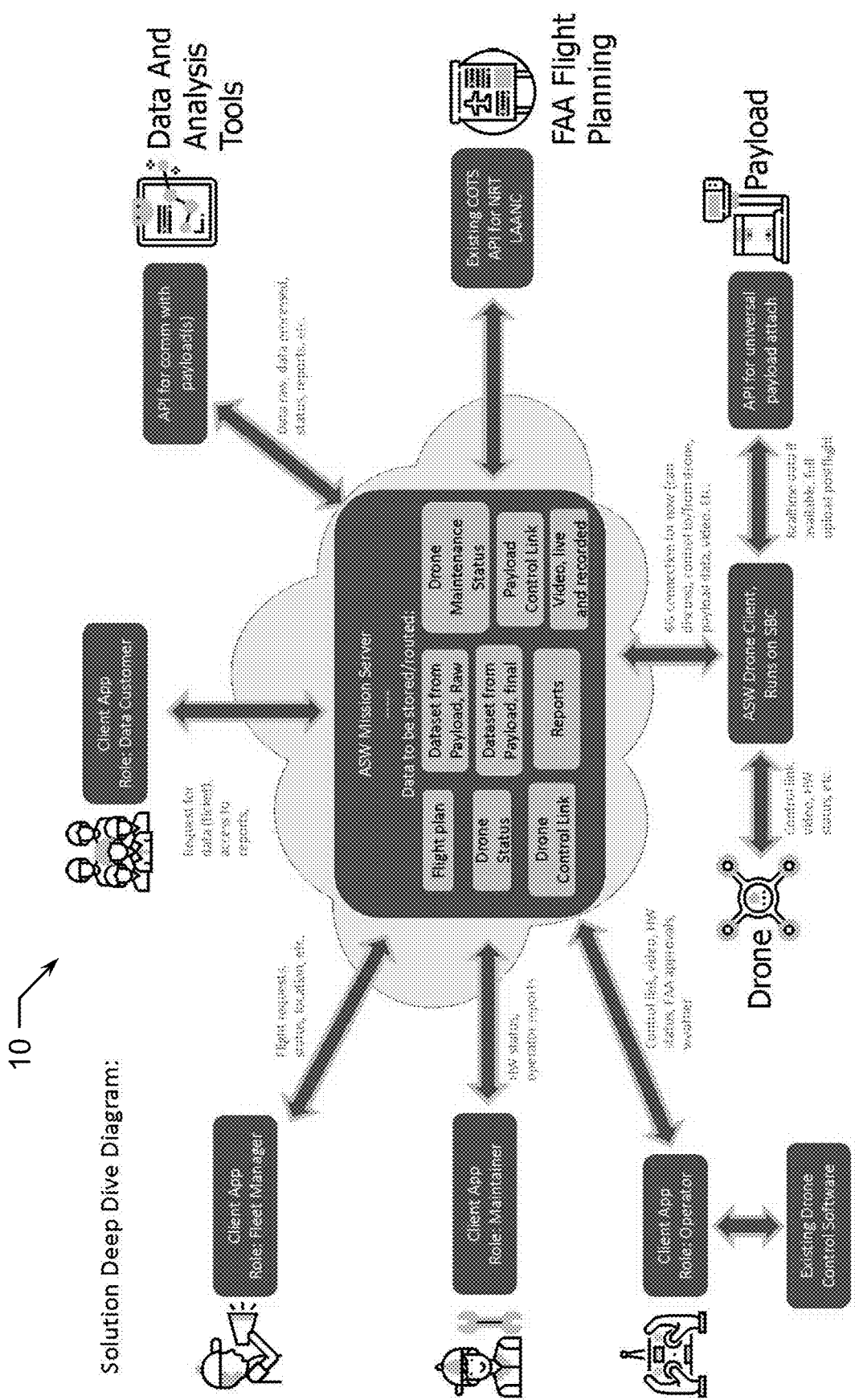

UNIFIED DATA MANAGEMENT SYSTEM FOR UNMANNED VEHICLES USING DISTRIBUTED ARCHITECTURE

FIELD OF THE INVENTION

The present invention relates to unmanned vehicle operation, and in particular to unmanned aerial vehicle or system (UAS, also commonly referred to as a UAV (Unmanned Aerial Vehicle), RPA (Remotely Piloted Aircraft), or a drone, see: The Forbes website for an article posted on Aug. 15, 2017 and entitled "What Are The Differences Between Drones, UAVs, And RPVs?") improved operational efficiency and control via a unified data management system using a distributed architecture.

BACKGROUND OF THE INVENTION

Various means are known in the art for controlling select functions of a UAS over a network or the "Cloud" (see: The Vox website for an article posted on Apr. 30, 2015 and entitled "Too Embarrassed to Ask: What Is 'The Cloud' and How Does It Work?"). Examples of such control are disclosed in the following list of a US patent, a US patent application, and a Chinese patent, all of which are expressly incorporated herein by reference: U.S. Pat. No. 10,185,316 to Kablaoui, US 2016/0246297 to Song, and CN 104932529 to an Unknown Inventor. However, such means have typically focused on a single intercommunication challenge, with the Cloud acting merely as a "pass-through" for connectivity and have not comprised a common, critical infrastructure to bridge all facets of UAS operations through a single hub that simplifies and secures all data transfers.

SUMMARY OF THE INVENTION

The present invention is a unified data management system for operating a UAS using a preferably open architecture (see: Wikipedia's website for the entry "Open architecture"), distributed architecture (see: Tutorialspoint website for the entry "Distributed Architecture") system (the System) and a method of use thereof. In contrast to prior systems that largely comprise disparate single function systems, the System disclosed herein preferably provides for the functional operation of all aspects required for operating a UAS, and more preferably for operating a UAS throughout its service life. Such aspects may include for instance remote command and control operations (RCC), video operations, government flight authorization (including FAA authorizations), government flight monitoring (see the FAA's website for the entry "UAS Remote Identification") maintenance management, flight data analysis (including historical flight data—flight logs, sensor data, maintenance records, etc.) flight data storage and verification (for insurance, audit, enforcement, trust purposes), payload control, payload data routing and dissemination, payload monitoring, customer creation of requests, UAS execution of those requests, real-time flight status (including location). Further, the System disclosed herein is preferably constructed via a plurality of modules or individual sub-programs, each of which cooperatively function with the other modules which comprise the System, such that the System functions as a cooperative whole in the operation of a UAS. The System being comprised of a plurality of modules provides for adaptability of the System to new and even yet even unforeseen needs. When such need arises, a module tailored to satisfy such need may be prepared and integrated into the System. Further, in the case where the System comprises an open architecture System, third party users may create new modules that may be optionally incorporated into the system. Moreover the System, being preferably operated via a distributed architecture, allows for simultaneous access and use of the System via a plurality of users, with each user being in a separate physically remote location (e.g. users connect to the System stored in the Cloud via the Internet).

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 is a schematic diagram of an exemplary organization of the System and illustrating in concept the interconnectivity of the various modules and usage roles of the System.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the FIGURES.

Referring now to the drawings, System 10 is a unified data management system for operating a UAS using a preferably open architecture distributed architecture and a method of use thereof. System 10 preferably provides for the functional operation of all aspects required for operating a UAS, and more preferably for operating a UAS throughout its service life. Such aspects may include for instance remote command and control operations (RCC), video operations, government flight authorization (including FAA authorizations), government flight monitoring (see the FAA's web site for the entry "UAS Remote Identification") maintenance management, flight data analysis (including historical flight data—flight logs, sensor data, maintenance records, etc.) flight data storage and verification (for insurance, audit, enforcement, trust purposes), payload control, payload data routing and dissemination, payload monitoring, customer creation of requests, UAS execution of those requests, real-time flight status (including location). Further, System 10 disclosed herein is preferably constructed via a plurality of modules or individual sub-programs, each of which cooperatively function with the other modules which comprise the System, such that the System functions as a cooperative whole in the operation of a UAS. Such functioning is achieved in part by providing application programming interfaces (APIs see: Wikipedia's web site for the entry "application programming interface (API)") between components, allowing the modules to access communication flows while still maintaining fine-grained access control. This design bridges human stakeholders and the UAS (both hardware and software entities) through a decentralized Cloud—with redundant access from anywhere on the globe. The parties connect to the Cloud through traditional Internet (with the UAS wirelessly connecting to the Internet) using a desktop computer, a laptop computer, a tablet, a smart phone, or like devices adapted for such use. Once connected, the parties authenticate and achieve access to applications based on their credentials and assigned permissions. Using System 10, each party needs to only to maintain a single communication line with the System 10 (sending and receiving requested information) while System 10 handles the complex collaborations necessary to plan, approve, and execute UAS missions. This includes for instance access to data and information from previously flown missions, such as flight logs, sensor data, or maintenance records. Such a distributed architecture gives every stakeholder a virtualized, simple work experience while managing direct access to the data, tools, hardware, and people as needed. System 10, being comprised of a plurality of modules provides for adaptability of System 10 to new and even yet even unforeseen needs. When such need arises, a module tailored to satisfy such need may be prepared and integrated into System 10. Further, in the case where System 10 comprises an open architecture system, third party users may create new modules that may be optionally incorporated into System 10. Moreover System 10, being preferably operated via a distributed architecture, allows for simultaneous access and use of System 10 via a plurality of users, with each user being in a separate physically remote location (e.g. users connect to System 10 stored in the Cloud via the Internet).

To further illustrate the operation and benefits of System 10, System 10 is compared to prior state-of-the-art UAS operations (Prior Operations) via a theoretical inspection case (e.g. an inspection of a pipeline, a powerline, a wind farm, a solar farm, etc.). It is noted of course that System could be used in a variety of functions such as mapping/surveying, parcel delivery, search and rescue, wildlife/wildland management, surveillance, law enforcement and military uses, firefighting, and jobsite management. In an exemplary prior UAS operation, the following occur:

1) An Inspection/audit department (a customer) realizes a need for data.
2) The customer contacts (call, emails, etc.) a UAS fleet manager (or department).
3) The fleet manager manually determines the optimal asset (e.g. UAS, camera, etc.) and operator (person who will fly the UAS and operate the equipment).
4) The fleet manager schedules the operator.
5) The operator goes (drives) to flight field when he is able.
6) The operator conducts the mission—the mission is conducted locally and there is no IoT connectivity (see the web site Webopedia for an article entitled "Internet Of Things").
7) The operator performs maintenance checks.
8) The operator performs UAS preflight checks.
9) The operator prepares the payload (if any).
10) The operator conducts the flight.
11) The operator "postflights" the UAS ("postflight" as used herein shall mean everything that is physically inspected or done to the UAS after a flight or mission and may include physical inspection (e.g. nuts, bolts, propellers, etc.), proper shutdown or power-off sequences, proper shutdown of the payload (if applicable), any cleaning required, safe storage of power sources (fuel, batteries, etc.), disassembly, and storage).
12) The operator manually pulls the dataset from the payload.
13) The operator returns to his home location and manually provides the data to a data analyst (assuming that the data is good—if not steps 3-13 would need to be repeated).
14) The data analyst manually uploads the data to an analysis suite (software).
15) The data analyst "runs the job" (i.e. analyzes the data).
16) The data analyst creates a report of the data.
17) The report is provided to the fleet manager, an inspection department and the customer.
18) The customer reviews the report for actionability, determines any new flight requirements, etc.

Any additional requests are routed to the fleet manager and the cycle (of steps 1-19) is repeated if/as needed.

Completion of exemplary Prior Operations can run into days if not weeks. In the meantime, the maintenance operator is out of the loop and relies on paper logs and time-based (duration) rules for maintenance estimates. Further, if the Prior Operations flight occurred in a controlled airspace, the operator must make any required changes to the flight plan (e.g. due to weather, customer requests, etc.) on a web-based LAANC (see: the FAA's website for the entry "LAANC for Industry"), which is typically an iterative process and can includes days of delays. In such Prior Operations, the ratio of human-in-the-loop to UAS flight time is very high. In an exemplary instance of the disclosed System 10, the following occur:

1) A customer uses System 10 (remotely—e.g. at the Customer's home office) to submit a request ticket.
2) System 10 automatically generates and provides a notification of the ticket to a fleet manager.
3) In response to the ticket notification the fleet manager approves a mission which causes System 10 to automatically dispatch assets based on maintenance status, mission location, payload type, etc.
4) The appropriate UAS is delivered to the mission location.
5) UAS preflight checks (maintenance status, etc.) are performed partially (or fully) automatically.
6) The operator—who may be on site or remotely located—conducts the mission. Launch of the UAS typically occurs within minutes of the UAS arrival.
7) During the mission, mission data package is fed into an analytics package (software) in real-time and processing of the data begins immediately.

Upon landing of the UAS, the customer and the analyst validate the flight and if any repetitions or additions are needed, they can happen the same day as the initial mission.

Completion of exemplary operations by System 10 can be done in hours. In the disclosed invention, maintenance is preferably predictive and is preferably performed preemptively as predicted/dictated by System 10. If the Prior Operations flight occurred in a controlled airspace, System 10 automatically coordinates LAANC requests, makes any needed changes to the flight plan and automatically submits the same, and automatically routes approvals to the operator. Customer access to data is available through a client application (software module) and is tied to all mission data for audit and repeatability purposes. In the disclosed invention of performing such operations via System 10, the ratio of human-in-the-loop to UAS flight time is very low. The System 10 provides for greater automation, reduced cycle times, and a reduction in the overall cost of performing UAS operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of operating a UAS comprising the steps of:
   providing via the Internet to a user located in a position remote to a UAS, command and control of said UAS; and
   providing via the Internet to a user located in a position remote to a UAV, at least one function of real-time flight status acquisition, video data acquisition, government flight authorization acquisition, government flight monitoring acquisition, UAS maintenance data acquisition, real-time flight data acquisition, historical flight data acquisition, real-time flight data analysis, historical flight data analysis, customer change request creation, UAS execution of customer change requests, and camera payload requirement definition.

2. The method of claim 1, wherein the method includes the step of automatically acquiring mission specific government flight authorization.

3. The method of claim 1, wherein the method includes the step of automatically assessing the maintenance of said UAS.

4. The method of claim 1, wherein the method includes the steps of flight status acquisition, video data acquisition, government flight authorization acquisition, UAS maintenance data acquisition, real-time flight data acquisition, real-time flight data analysis, and defining payload requirements.

5. The method of claim 1, wherein the method includes the step of inspecting a ground-based target.

6. The method of claim 5, wherein said target comprises at least one of a pipeline, a powerline, a wind farm and a solar farm.

7. The method of claim 1, wherein the method includes the step of automatically selecting a mission capable UAS and mission specific equipment.

8. The method of claim 1, wherein the method includes the steps of automatically acquiring mission specific government flight authorization, automatically assessing the maintenance of said UAS, automatically selecting a mission capable UAS and mission specific equipment, inspecting a target, and a plurality of the steps of flight status acquisition, video data acquisition, government flight authorization acquisition, UAS maintenance data acquisition, real-time flight data acquisition, real-time flight data analysis, and defining payload requirements.

9. A computer program product for operating a UAS, comprising: a non-transitory computer-readable medium comprising: code for causing the steps of method 1 to be performed.

10. The computer program product of claim 9, wherein said computer program product comprises a plurality of modules.

11. The computer program product of claim 10, wherein said plurality of modules are connected via at least one API.

12. The computer program product of claim 10, wherein said product is adaptable so as to have at least one additional module related to additional at least one function added thereto.

13. The computer program product of claim 9, wherein said computer program product comprises an open architecture product.

14. The computer program product of claim 9, wherein said computer program product is stored on and accessed via Cloud storage.

15. The computer program product of claim 9, wherein a user thereof is assigned a role and an access credential in order to access and use said product.

16. The computer program product of claim 9, wherein said computer program product comprises a plurality of modules, said modules being connected via at least one API, and wherein said product is adaptable so as to have additional modules related to additional functions added thereto, and wherein said computer program product comprises an open architecture product, and wherein said computer program product is stored on and accessed via Cloud storage.

17. The computer program product of claim 9, wherein said code causes the steps of method 8to be performed.

18. The computer program product of claim 16, wherein said code causes the steps of method 8 to be performed.

19. An apparatus for operating a UAS, comprising: a processor; a memory in electronic communication with the processor; instructions stored in the memory, the instructions being executable by the processor to: cause the performance of the steps of method 1.

20. The apparatus of claim 19, wherein said processor causes the steps of method 8 to be performed.

* * * * *